(12) United States Patent
Dartois et al.

(10) Patent No.: US 9,083,398 B2
(45) Date of Patent: Jul. 14, 2015

(54) BASE TRANSCEIVER STATION AND ASSOCIATED METHOD FOR COMMUNICATION BETWEEN BASE TRANSCEIVER STATION AND USER EQUIPMENTS

(75) Inventors: Luc Dartois, Nozay (FR); Samuel Betrencourt, Clamart (FR)

(73) Assignee: Alcatel Lucent, Boulogne-Billancourt (FR)

( * ) Notice: Subject to any disclaimer, the term of this patent is extended or adjusted under 35 U.S.C. 154(b) by 768 days.

(21) Appl. No.: 13/377,640

(22) PCT Filed: May 28, 2010

(86) PCT No.: PCT/EP2010/057397
§ 371 (c)(1),
(2), (4) Date: Jul. 3, 2012

(87) PCT Pub. No.: WO2010/145929
PCT Pub. Date: Dec. 23, 2010

(65) Prior Publication Data
US 2012/0264469 A1    Oct. 18, 2012

(30) Foreign Application Priority Data
Jun. 15, 2009  (EP) ..................................... 09290451

(51) Int. Cl.
*H04B 7/00*  (2006.01)
*H04B 7/04*  (2006.01)
(52) U.S. Cl.
CPC .................................. *H04B 7/0408* (2013.01)
(58) Field of Classification Search
CPC .................................................... H04B 7/0408

USPC ......................................................... 455/509
See application file for complete search history.

(56) References Cited

U.S. PATENT DOCUMENTS

| 7,853,216 B1 * | 12/2010 | Breslin et al. | ............... 455/67.11 |
| 2002/0135514 A1 * | 9/2002 | Yoshida | ........................ 342/378 |
| 2002/0150065 A1 * | 10/2002 | Ponnekanti | .................... 370/334 |

(Continued)

FOREIGN PATENT DOCUMENTS

| WO | WO 0129926 A1 * | 4/2001 |
| WO | WO 2007/091024 A | 8/2007 |

OTHER PUBLICATIONS

Goeusse et al., "Users Clustering Concept: Dynamic Concentric Cells Performance in WCDMA System," IEEE Vehicular Technology Conference, pp. 2369-2373, XP001076182, May 6, 2001.

(Continued)

*Primary Examiner* — Wesley Kim
*Assistant Examiner* — Devan Sandiford
(74) *Attorney, Agent, or Firm* — Fay Sharpe LLP

(57) ABSTRACT

The invention relates to a base transceiver station (BTS) for communicating with a plurality of user equipments (UE1, UE2, UE3, UE4, UE5) divided in at least two groups, said base station comprises: an antenna element arrangement generating at least two shifted static beams (Bi, Bo) with respective down tilts for reaching the user equipments (UE1, UE2, UE3, UE4, UE5) a processing unit (25) connected to said transceiver chains (9) and having means for performing at least two linear complex combinations of up-link digital signals—means for receiving said up-link signals and for selecting per user equipment the appropriate beam based on the quality of said up-link signals in the beam flows (Fi,FO).

11 Claims, 3 Drawing Sheets

(56) References Cited

U.S. PATENT DOCUMENTS

| | | | |
|---|---|---|---|
| 2004/0179544 A1* | 9/2004 | Wilson et al. | 370/442 |
| 2004/0185775 A1* | 9/2004 | Bell et al. | 455/12.1 |
| 2005/0202859 A1* | 9/2005 | Johnson et al. | 455/575.7 |
| 2005/0206564 A1* | 9/2005 | Mao et al. | 342/377 |
| 2006/0116092 A1* | 6/2006 | Uno et al. | 455/134 |
| 2007/0097012 A1* | 5/2007 | Sanelli et al. | 343/893 |
| 2008/0089396 A1* | 4/2008 | Zhang et al. | 375/220 |
| 2009/0058725 A1* | 3/2009 | Barker et al. | 342/372 |
| 2010/0123618 A1* | 5/2010 | Martin et al. | 342/174 |

OTHER PUBLICATIONS

Yun et al., "Spectrum efficient region-based resource allocation with fractional loading for FH-OFDMA cellular systems," vol. 41, No. 13, 2 pages, Jun. 23, 2005.

International Search Report for PCT/EP2010/057397 dated Jul. 26, 2010.

* cited by examiner

BASE TRANSCEIVER STATION AND ASSOCIATED METHOD FOR COMMUNICATION BETWEEN BASE TRANSCEIVER STATION AND USER EQUIPMENTS

The invention relates to a base transceiver station comprising an antenna element arrangement. The invention also relates to a method to optimize the capabilities offered by such a multiple antenna arrangement. Objective is to optimize the spectrum efficiency using real time analysis of the information extracted within the different beams used to manage the traffic within the same logical cell.

Radio communication networks are equipped with base transceiver stations comprising antennas adapted to cover a predefined cell of the network and communicating with user equipments in this cell. For a given coverage requirement provided the different beams for a given spectrum resources can be optimized in order to reduce the densification requirements assuming radio resources are scarce.

Due to the constraints in term of location for the base stations, it is necessary to be able to optimize the radio cell geometry (Ii/(Ie+Ii) where Ii is the internal cell interference and Ie the interference coming from other cells) to offer the requested Qos per user located in the cell.

With legacy antenna system a unique downtilt which represents the inclination of the antenna in the elevation direction is calculated to provide the appropriate coverage. This downtilt is either fixed or mechanically preset on site or can be remotely modified using a remote control motor able to move the antenna in the elevation direction.

New radio communication networks have the requirement to provide more efficient services in term of bit rate and in term of capacity. The constraints linked to the coverage requirement using a legacy antenna system doesn't offer the flexibility to optimize the coverage/capacity compromise since coverage is always preferred to reduce the sites numbers.

To optimize the capacity/coverage requirements some new methods based on multiple antennas at a base station site have been proposed which tend to parallelize the data transmission (to reach higher bit rate) while limiting the interference (to ensure high capacity). Multiple Input Multiple Output (MIMO) and beamforming are such methods.

Further, by splitting the cell and all associated hardware either horizontally (several sectors per cell) or vertically (concentric cells), more user equipments can communicate with the base station.

However, in such a solution, additional antenna arrangement and hardware are required, and then this solution can be relatively expensive.

One object of the invention is to overcome the drawback of state of the art by improving communications between multiple user equipments and the base station without increasing hardware and software.

This objective is achieved according to the invention by a base transceiver station for communicating with a plurality of user equipments divided in at least two groups, said base station comprises:

an antenna element arrangement generating at least two shifted static beams with respective down tilts for reaching the user equipments and comprising a plurality of antenna elements respectively connected to transceiver processing chains for exchanging communication signals between the base transceiver station and the user equipments, a processing unit connected to said transceiver chains and having means for performing at least two linear complex combinations of digital signals received between said antenna elements and the base transceiver station for the same spectrum resources, and processing beam flows respectively associated to said generated beams, with up-link signals received from user equipments, means for receiving said up-link signals and for selecting per user equipment the appropriate beam based on the quality of said up-link signals in the beam flows.

With such an arrangement, cell coverage is kept while reducing interferences per beam, for maximizing the performances of each group of users, without increasing hardware and software associated to the antenna element arrangement.

Compared to well beam forming features trying to identify a beam per user, the same static and predefined beam is allocated to a group of users.

Moreover using the two statistic beams, the up-link performances are improved if a user equipment is received within both beams since spatial diversity decorelates the fadings.

According further embodiments of the invention:
said antenna element arrangement is adapted to generate an inner beam and an outer beam, wherein the inner beam reaches user equipments located close to said antenna element arrangement, and the outer beam reaches user equipments located far from said antenna element arrangement, the processing unit comprises means for applying complex antenna weights to said antenna elements, so that said antenna element arrangement generates beams in predefined and elevation direction, said base transceiver station comprises means for comparing the carrier to interference ratio between up-link signals received per beam for the same spectrum resources with a predetermined threshold, to determine the appropriate beam to be used, said base transceiver station comprises means to isolate said up-link signals received per beam, said base transceiver station is configured to identify the appropriate beam for the down-link transmission based on the appropriate beam determined for up-link transmission, said base transceiver station comprises a feedback channel monitoring the quality of the down-link signal to validate said beam selected for down-link transmission, said base transceiver station comprises means for identifying the appropriate down-link resources used per beam to be used and reused in each beam, said processing unit comprises means for directing beam flows with down-link signals to respective beams bound to user equipments using respective beams.

The invention also relates to a method for communication between a base transceiver station and a plurality of user equipments divided in at least two groups, said base station comprises an antenna element arrangement generating at least two shifted static beams with respective down tilts for reaching the user equipments and comprising a plurality of antenna elements respectively connected to transceiver processing chains for exchanging communication signals between the base transceiver station and the user equipments, a processing unit connected to said transceiver chains and having means for performing at least two linear complex combinations of digital signals between said antenna elements and the base transceiver station for the same spectrum resources, said method comprising following steps:

process beam flows respectively associated to said generated beams, with up-link signals received from user equipments, receive said up-link signals and select per user equipment the appropriate beam based on the quality of said up-link signals in the beam flows.

According further embodiments of the invention:

said method comprises further following steps:

for each beam flow, compare the carrier to interference ratio between up-link signals received per beam for the same spectrum resources with a predetermined threshold, if said ratio meets or exceeds said threshold, select the beam with the highest power level at user equipment location and assign said user equipment to the selected beam, otherwise combine said beams flows using a maximum ratio combining, said method comprises processing step such as multi-user detection, interference cancellation or direct 16QAM demodulation/modulation, said method comprises further processing:

identify the appropriate beam for the down-link transmission based on the appropriate beam determined for up-link transmission, monitoring the quality of the down-link signal to validate said beam selected for down-link transmission.

Complexity of the algorithms is reduced since number of users per beam is statistically reduced. On up-link, the reduction of frequency reuse factor (Ie/Ii) and the intra cell interference reduction per beam improves the efficiency of additional processing step.

Further details and advantages of the invention will become apparent from the exemplary embodiments explained below with reference to figures, in which.

In a multiuser system such as WCDMA (Widebande Code Division Multiple Access), a plurality of users are provided with a communication link from user equipments, such as cellular phone or computer, to a base transceiver station BTS connected to a wired network.

Figure 1:
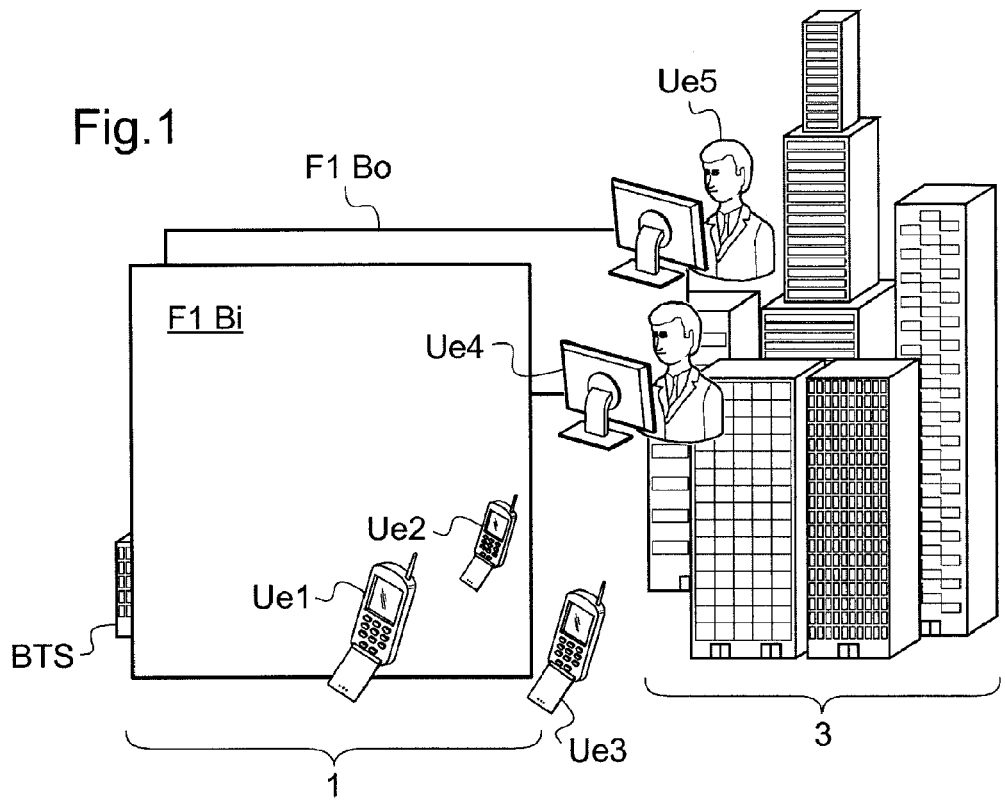
FIG. 1 shows a communication network according to the invention.

FIG. 1 shows an example of the present invention. Multi beam can be used to reach indoor and outdoor users in case of dense urban scenario with building. In the described embodiment, the user equipments UE1 to UE5 are separated into two groups, a first group of indoor users close to the base station BTS and located in an inner cell 1, and a second group outdoor users located in an outer cell 3.

Figure 2:
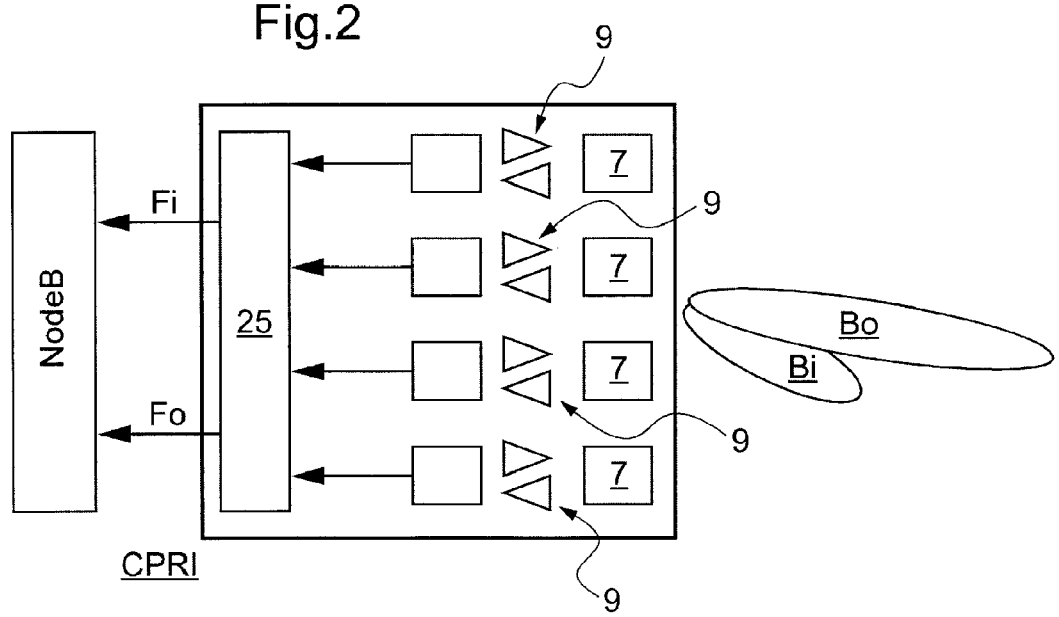
FIG. 2 illustrates an antenna element arrangement of the communication network of FIG. 1.

More precisely, all users are managed by the same logical cell object in the network locally divided in two spatial volumes: inner cell 1 and outer cell 3, two first user equipments UE1 and UE2 are located near the base station BTS in the inner cell 1, another user equipment UE3, such as a mobile phone, is located with a higher distance to the base station BTS in-between both cells 1 and 3, and two end user equipments UE4 and UE5 (such as a computer) are located in a building covered by the same logical cell in the outer cell 3, As shown in more detail in FIG. 2, the base station BTS comprises an antenna element arrangement 5, such as active antenna array or smart antennas, adapted to cover a predefined area in the network.

The antenna arrangement comprises a array of several radiating elements 7, in the simplified example of FIG. 2, the antenna arrangement comprises four radiating elements 7.

The radiating elements 7 are here patch elements. Alternatively, dipoles may be used.

Each radiating element 7 is connected to a respective transceiver processing chain 9 for transmitting and receiving down-link/up-link communication signals to and from the user equipments UE1 to UE5.

Each transceiver chain 9 comprises a respective transmitter and receiver.

Figure 3:
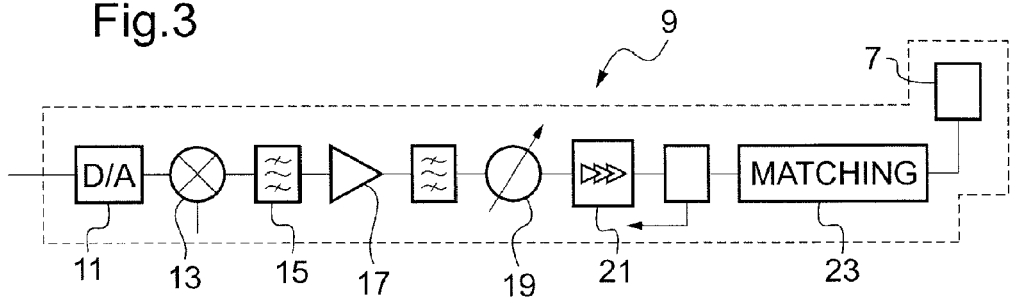
FIG. 3 is an example of a transceiver chain of an antenna element arrangement.

A variant of transceiver processing chain 9 is shown in detail in FIG. 3.

The processing chain 9 receives as input a sum of baseband signal components. The digital baseband signal is converted to analog signal at module 11, upconverted at module 13, filtered at module 15, pre-amplified at module 17, power controlled at module 19 and amplified at amplifier 21 in the processing chain. A part of the signal at the output of amplifier 21 is fed back for retro loop purpose and the main part of the signal is submitted to the antenna element arrangement, and reversely for the up-link signals. Matching modules 23 are responsible for distributing the input power over the different antenna elements 7.

Not all modules described as part of the processing chain 9 are necessary to reach this effect so that some of these modules may be omitted.

The antenna arrangement 5 (FIG. 2) is also provided with a processing unit 25 connected to all of the transceiver chains 9.

This processing unit 25 comprises signal ports respectively coupled to the transceiver chains 9, and a linear complex combination means (not shown) of the digital signals received from transceiver chains 9 with phase shifter for altering phase difference between the several linear complex combinations, in order to form several phase shifted beams with respective down tilts, for example an inner beam Bi and an outer beam Bo. Phase shifter may be adjustable to vary downtilt of the beams Bi,Bo.

Using this architecture, two or more beams Bi,Bo can be generated for reaching different user equipments UE1 to UE5 without requiring further antenna element nor antenna arrangement and reusing the same radio resources.

Further, effect of intra-cell interference is reducing while improving isolation of users signals seen in two groups through both beams Bi,Bo and isolation of their associated beam flows Fi,Fo containers over the Common Public Radio Interface (CPRI). Without end to end isolation gain are only available in the down-link way.

Moreover, each beam Bi,Bo may be generated in predefined elevation directions to be able to reach each group of user equipment with the best accuracy. Such a solution allows maximizing the antenna arrangement gain and increasing the received signal quality preferably reducing the intra and inter-cell interference.

Further, the processing unit 25 is also adapted for sending inner Fi and outer Fo flows associated to the inner Bi and the outer Bo beams to the base station modem NodeB in up-link transmission and for receiving said modem signals to be transmitted to user equipments UE1 to UE5 in down-link transmission, over the Common Public Radio Interface (CPRI) using a suitable multiple access method, such as High Speed Packet Access (HSPA).

The modem NodeB can assign user equipments to the inner or outer cell basing on the signal strength of the up-link signals on the dedicated physical control channel (DPCCH) of both beams flows Fi,Fo.

Figure 4:
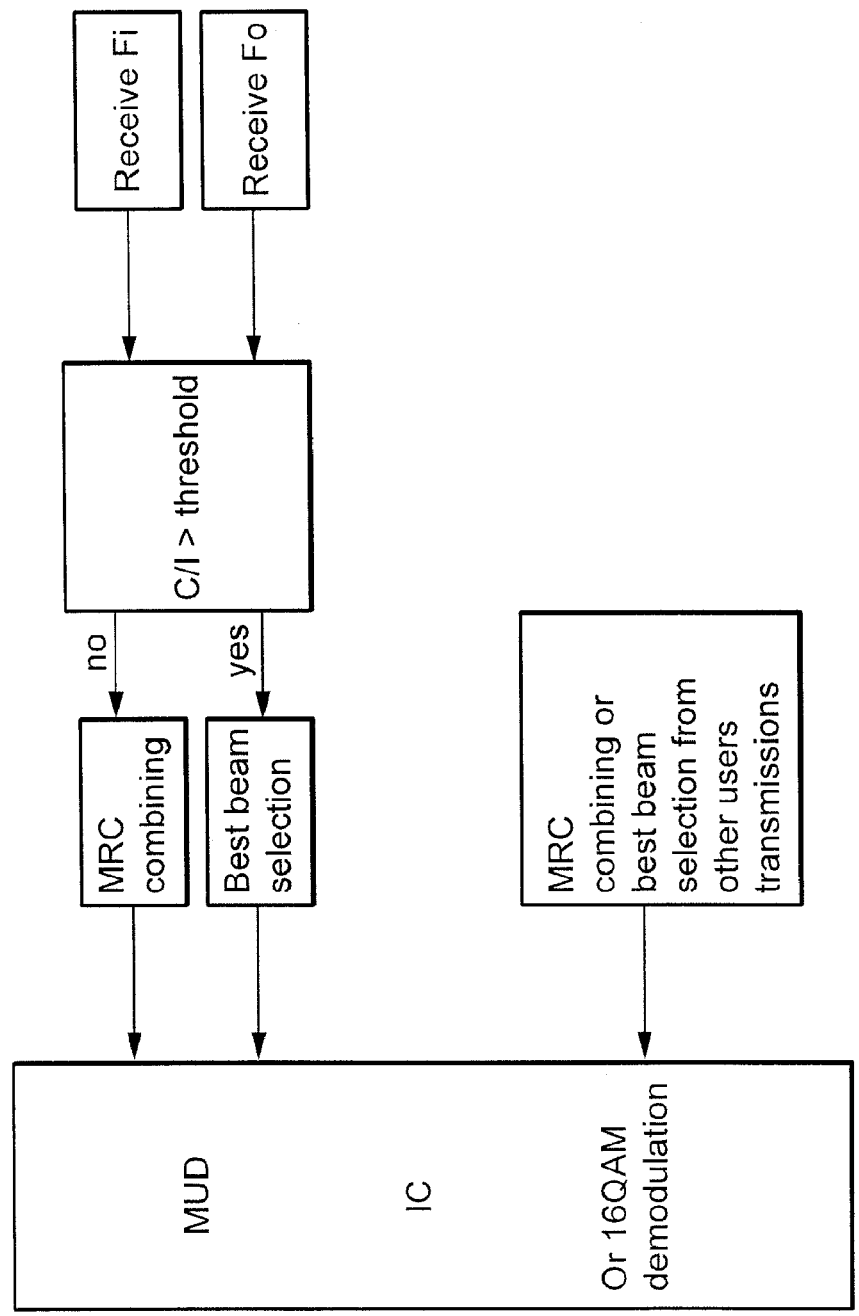
FIG. 4 illustrates examples of processing of beams flows.

For that purpose, the modem comprises a comparator (not shown) for comparing for each beam flow Fi,Fo, the carrier to interference ratio (C/I) with a predetermined threshold (FIG. 4).

Thus, in the described embodiment a method for processing multiple antenna elements comprises following steps.

The processing unit 25 (FIG. 2) performs a first and a second linear complex combinations of all digitals signals received from transceiver chains 9. However, the processing unit 25 can perform more than two linear complex combinations.

Then, the processing unit 25 applies a first phase to the first combination so that first down-link signals are transmitted in an inner beam Bi with a given down tilt such as −8° or −10° and having a main lobe covering the inner cell 1. Conversely, up-link signals are received from a reception zone defined by the main lobe (FIGS. 1,2).

Similarly, the processing unit 25 applies a second phase to the second combination providing phase shift with the first combination and so that second down-link signals are transmitted in an outer beam Bo with a given down tilt such as −2° and having a main lobe covering the outer cell 3. Conversely, up-link signals are received from a reception zone defined by the main lobe.

The processing unit 25 may also apply to each baseband signal input to each transceiver chain, first complex weights for reaching the azimuth direction and second complex weights for reaching the elevation direction. That enables the transceiver chains 9 to control independently the different antenna elements 7 and to use different antenna element weights for each antenna element 7. The location of the user equipment (distance to the base station, azimuth angle, elevation angle) relative to the base station BTS may be reported to the base station BTS so that it can calculate the appropriate complex antenna weights to apply to the different antenna elements 7.

Up-Link Transmission

Referring now to up-link transmission, in which up-link signals at same frequency F1 (FIG. 1) are transmitted from the user equipment to the base station on a link shared by multiple users.

For each user equipment transmission, the modem NodeB receives both beams flows Fi,Fo over the CPRI. The digital signals received are isolated over the CPRI. The nodeB compares per user for each beam flow Fi,Fo for the same spectrum resources, the carrier to interference ratio (C/I) with a predetermined threshold (FIG. 4).

If the C/I ratio meets or exceeds the predetermined threshold, the user equipment is clearly centered under only one beam, then selection of the best beam is performed by a selector of the modem.

Figure 5:
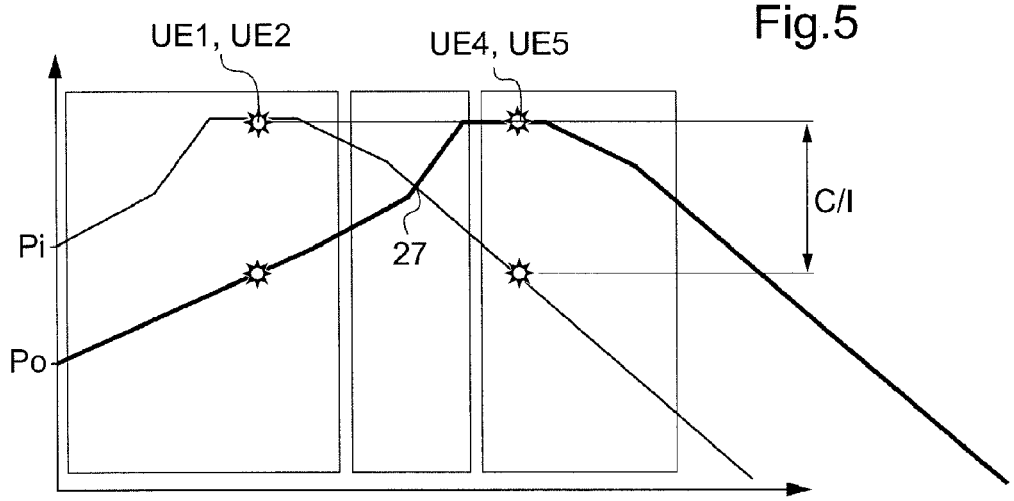
FIG. 5 is a graph illustrating the variation of the power level of two beams projected on cell radius.

As illustrated in FIG. 5, the power level Pi of the inner beam Bi is higher than the power level Po of the outer beam Bo close to the antenna arrangement 5. On the contrary, the power level Po of the outer beam Bo is higher than the power level Pi of the inner beam Bi far to the antenna arrangement 5. The situation reverses itself at the crossover point 27.

The modem NodeB assigns a user equipment:
to the inner cell 1 when the power level Pi of the inner beam Bi is higher than the power level Po of the outer beam Bo, (left of the crossover point 27 in FIG. 5), by instance first user equipments UE1 and UE2, and
to the outer cell 3 when the power level Po of the outer beam Bo is higher than the power level Pi of the inner beam Bi, (in FIG. 5 right of the crossover point 27), by instance end user equipments UE4 and UE5.

Referring again to FIG. 4, if the C/I ratio doesn't meet or exceed the threshold, that means the user equipment is located in-between both beams Bi,Bo (such as user equipment UE3 in FIG. 1).

In consequence, Maximum Ratio Combining (MRC) is performed by a MRC module of the modem. In MRC, the received signals are combined based on the assumption that the interference closely approximates white Gaussian noise: each received signal is weighted by a selected weighting factor and the received signals are combined. Spatial diversity is improved for such situation since multi beam guarantee decorrelation between signals reception. Assuming 2 ways spatial diversity are available per beam, performances are equivalent to a 4 way spatial diversity system in the up-link.

Alternatively, only MRC can be performed.

Further processing of the best beam flow or the combined flow are then performed with higher signal to noise ratio (SNR) or carrier to interference ratio (C/I) and permit to extract the information content from each user equipment transmission.

Figure 6:
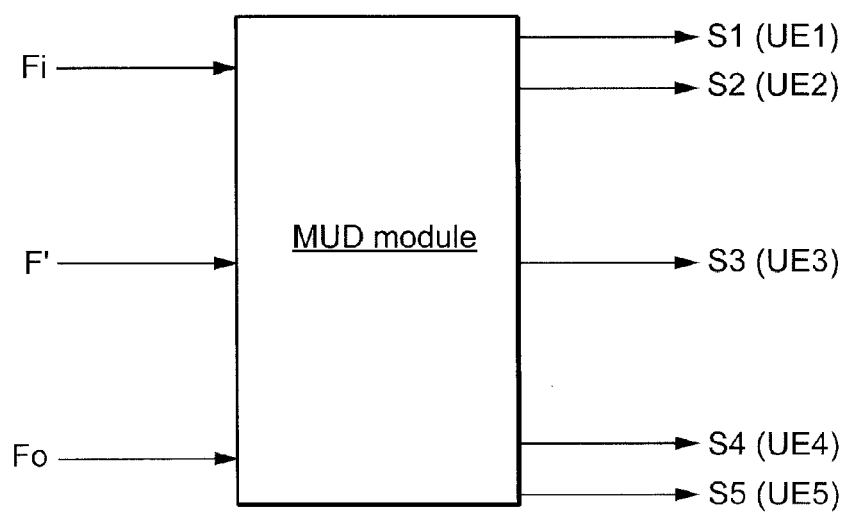
FIG. 6 is an example of multiuser detection.

Further processing may be Multi User Detection (MUD), Interference Cancellation (IC) after each connected user is associated to one beam. In the example illustrated in FIG. 6, a MUD module receives the inner beam flow Fi, the outer beam flow Fo and a MRC combined flow F', and outputs several signals, here five signals S1 to S5, each of them being associated to a respective user equipment UE1 to UE5.

Moreover, various IC algorithms can reduce effective interference such as successive IC, iterative parallel IC. Spatial interference algorithm could also be used to eliminate the Bi to BO interference contribution and vice versa.

In successive IC, users are ordered by their chance of successful decoding and the packet of the strongest user is decoded first. After a packet is decoded, the signal is reconstructed and subtracted from the received signal. The rest of users are ordered again for next round of decoding. The procedure is performed iteratively over all users. In general, a user decoded later benefits from cancellation of previous users and encounters improved Signal to Interference and Noise Ratio.

In iterative parallel IC, multiple users are decoded and cancelled from the received signal simultaneously.

Users may also be divided into groups and then Parallel IC is performed on high priority groups to low priority groups successively.

Down-Link Transmission

Referring now to down-link transmission in which down-link signals are modulated for transmission to the beams bound for user equipments located under the beams.

Key objective is to split the resources per beam in down-link and also identify if these resources can be reused.

When establishing a link with user equipment, the base station estimates the best beam using the signal received from the user equipment. More precisely, the base station uses the information self learned in the up-link to identify for the down-link the best candidate beam.

As described above, this estimation is based on the comparison of the C/I ratio with a predetermined threshold or MRC weighing factor analysis. Then the base station BTS redirects the down-link flow on the best beam with the highest power level.

Outer loop and user feedback equipment analysis is made by the processing unit to validate the down-link beam selection since user equipment and transceiver module do not have the same antennas gains. Feedback channel monitoring loop ensures the selection based on the up-link signal analysis do not degrade the down-link performances.

Moreover, the base station can identify on real time the best candidate down-link resources (OVSF codes for example in UMTS) used per beam to be used in each predefined beams.

It will be understood by those skilled in the art that more than two groups of users may be created around a base station. The main criteria for creating groups would be to define several angle values corresponding to concentric circles around the base station in which different elevation angles are used for reaching the user located between two concentric circles.

Thus, two or more beams with respective down tilts can be used simultaneously, and by adjusting the down tilts of the beams the coverage of the cell is improved and interferences between cells reduced.

Indeed with this solution, an improvement of interference protection of bearers of the base station modem is noted (i.e. around 3 to 5 dB) what leads to increasing in a cell (i.e. by 50 to 70%) of the number of users that can access to these bearers over the cell coverage.

Moreover, there's no increase of overall needed hardware and only some modem software improvement are needed for processing both beams but don't require more processing effort.

The invention claimed is:

1. Base transceiver station (BTS) for communicating with a plurality of user equipments divided in at least two groups, said base station comprising:
    an antenna element arrangement generating at least two shifted static beams with respective down tilts for reaching the user equipments and comprising:
        a plurality of antenna elements respectively connected to transceiver processing chains for exchanging communication signals between the BTS and the user equipments;
        a processing unit connected to said transceiver chains and configured to perform at least two linear complex combinations of digital signals between said antenna elements and the base transceiver station for the same spectrum resources, and processing beam flows respectively associated to said generated beams, with up-link signals received from user equipments; and wherein the processing unit is configured to receive up-link signals and configured to select per user equipment an appropriate beam based on the quality of said up-link signals in the beam flows;
    wherein the processing unit, for each beam flow:
    compares a carrier to interference ratio (C/I) between up-link signals received per beam for the same spectrum resources with a predetermined threshold;
    selects the beam with the highest power level at the user equipment location and assigns the user equipment to the selected beam when the C/I meets or exceeds the threshold; and
    combines the beam flows using a maximum ratio combining (MRC) when the C/I does not meet or exceed the threshold.

2. The BTS according to claim 1, wherein said antenna element arrangement is adapted to generate an inner beam and an outer beam, wherein the inner beam reaches user equipments located close to said antenna element arrangement, and the outer beam reaches user equipments located far from said antenna element arrangement.

3. The BTS according to claim 1, wherein the processing unit applies complex antenna weights to said antenna elements, so that said antenna element arrangement generates beams in predefined elevation direction.

4. The BTS according to claim 1, comprising an isolator to isolate said up-link signals received per beam.

5. The BTS according to claim 1, wherein an appropriate beam for down-link transmission is identified based on an up-link transmission.

6. The BTS according to claim 5, comprising a feedback channel monitoring the quality of a down-link signal to validate said beam selected for down-link transmission.

7. The BTS according to claim 5, comprising an identifier configured to identify appropriate down-link resources used per beam to be used and reused in each beam.

8. The BTS according to claim 1, wherein said processing unit directs beam flows with down-link signals to respective beams bound to user equipments using respective beams.

9. A method for communication between a base transceiver station (BTS) and a plurality of user equipments divided in at least two groups, wherein said base station comprising:
    an antenna element arrangement generating at least two shifted static beams with respective down tilts for reaching the user equipments and comprising:
    a plurality of antenna elements respectively connected to transceiver processing changes for exchanging communication signals between the BTS and the user equipments;
    a processing unit connected to said transceiver chains and configured to perform at least two linear complex combinations of digital signals between said antenna elements and the base transceiver station for the same spectrum resources, said method comprising:
    processing beam flows respectively associated to said generated beams with up-link signals received from user equipments;
    receiving said up-link signals;
    selecting per user equipment the appropriate beam based on the quality of said up-link signals in the beam flows; and
    comparing, for each beam flow per user, a carrier to interference ratio (C/I) between up-link signals received per beam for the same spectrum resources with a predetermined threshold; wherein
    selecting and assigning the beam with the highest power level at the user equipment location to said user equipment when the C/I meets or exceeds the threshold; and
    combining the beam flows using a maximum ratio combining (MRC) when the C/I does not meet or exceed the threshold.

10. The method according to claim 9, comprising processing using multi-user detection (MUD), interference cancellation (IC) or direct 16QAM demodulation/modulation.

11. The method according to claim 9, wherein an appropriate beam for down-link transmission is identified based on an up-link transmission, and the quality of the down-link signal is monitored to validate said beam selected for down-link transmission.

* * * * *